March 2, 1965
R. M. BERGSLIEN ETAL
3,171,966
GENERATOR CONTROL SYSTEM
Filed Oct. 13, 1961
2 Sheets-Sheet 1
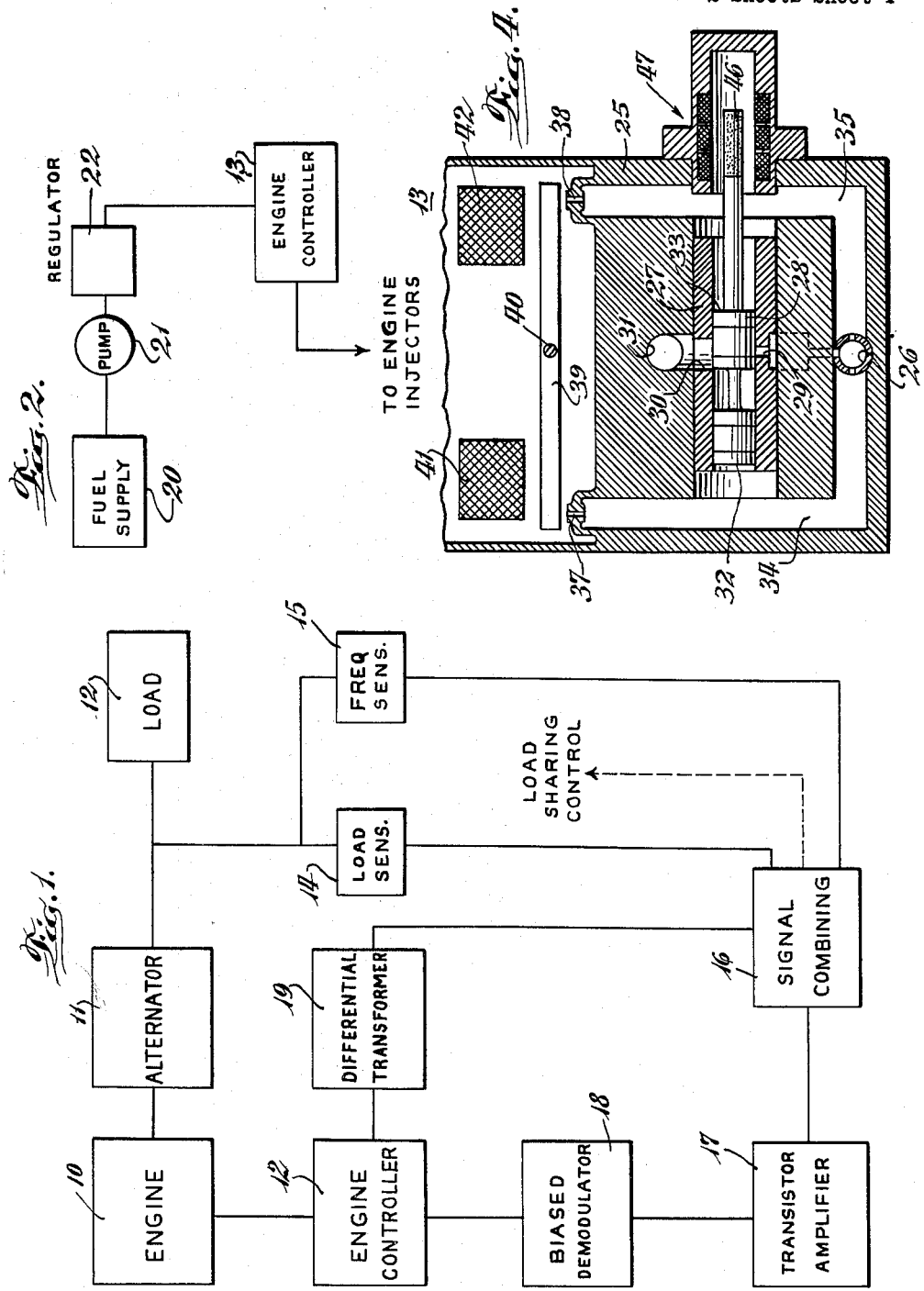
INVENTORS
ROBERT M. BERGSLIEN
EARL W. COLWELL

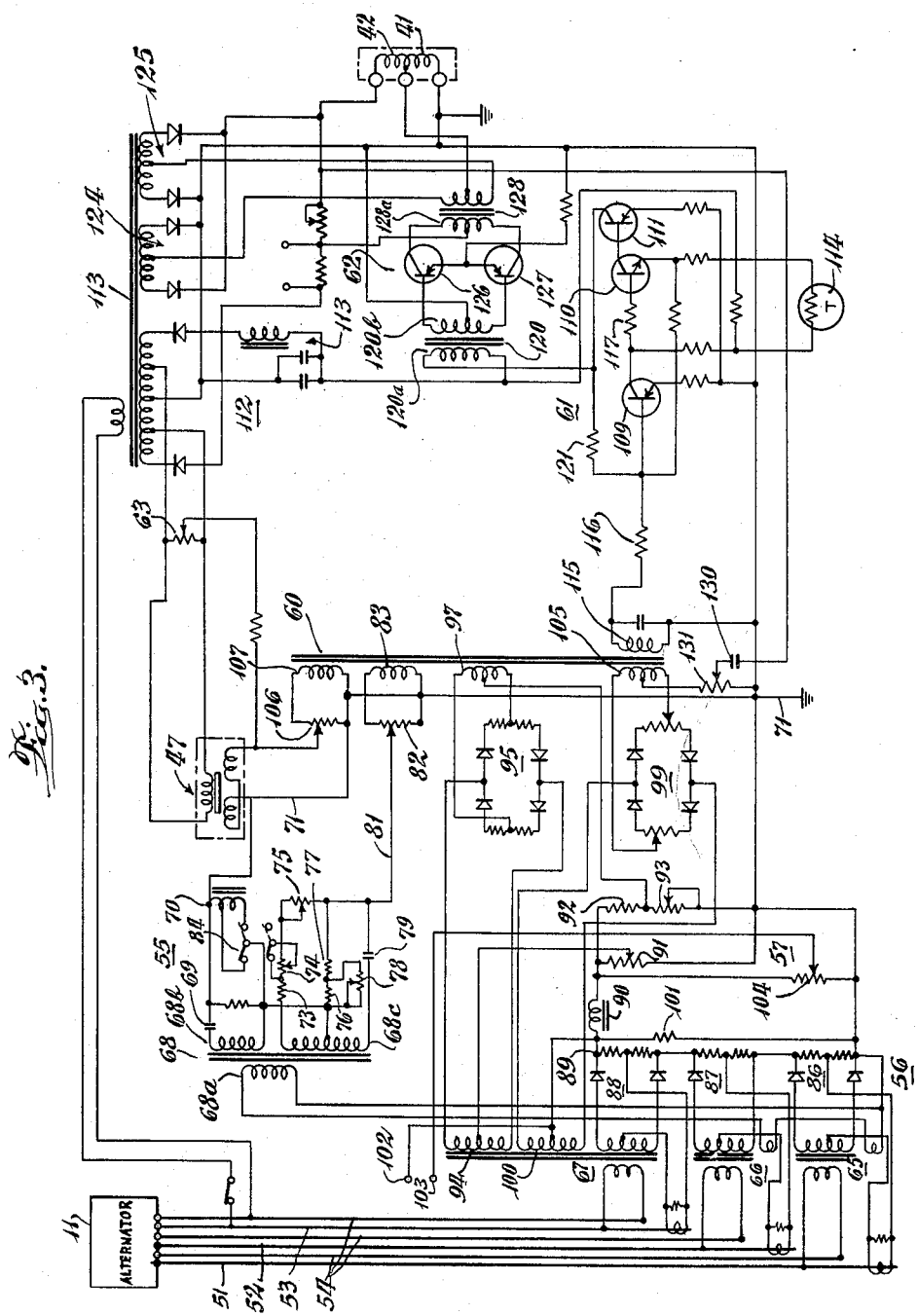

United States Patent Office 3,171,966
Patented Mar. 2, 1965

3,171,966
GENERATOR CONTROL SYSTEM
Robert M. Bergslien, Hazel Crest, and Earl W. Colwell, Joliet, Ill., assignors, by mesne assignments, to Esterline Angus Instrument Company, Inc., Indianapolis, Ind., a corporation of Delaware
Filed Oct. 13, 1961, Ser. No. 144,992
11 Claims. (Cl. 290—40)

This invention relates to an alternator control system and more particularly to an electrical control system for an alternator driven by a prime mover.

Auxiliary electrical power units, as for field or emergency use, often comprise a prime mover, as a diesel engine, which drives an alternator that supplies electrical power to a load. In many situations it is desirable to operate a plurality of such auxiliary power units in parallel so that they act together in a predetermined manner to supply the load. It is necessary that the generating system be provided with controls over the frequency of the generated energy and over the load division between units. This control must have a fast response to load changes, a high degree of stability and good reliability under field operating conditions.

It is a general object of this invention to provide a null seeking control system utilizing an alternating current transistor amplifier for an alternator driven by a prime mover.

One feature of the invention is the provision of a control system including means for sensing a condition of the output of the alternator and for developing an alternating signal as a function thereof, and a transistor amplifier having an input connected with the signal developing means and having an output connected with the fuel control valve to the prime mover.

Another feature is the provision of such a control system including means for developing alternating signals representative of the deviation of frequency from a desired frequency, of the load on the alternator, and a feedback signal responsive to the position of the fuel control valve, all of the signals being coupled to the alternating current transistor amplifier for effecting control of the prime mover.

Yet a further feature is the provision of such a control system including a phase sensitive demodulator circuit having a power output for controlling the actuation of the fuel valve in accordance with the net signal output of the amplifier.

And a further feature of the invention is the provision for such a system in which direct current signals are obtained as a function of the load on the alternator and utilized to modulate an alternating signal, preferably of one phase of the output of the alternator, and the phase sensitive demodulator is synchronized with such phase of the alternator.

Further features and advantages of the invention will readily be apparent from the following specification and from the drawings in which:

FIGURE 1 is a block diagram of a system incorporating the invention;

FIGURE 2 is a diagrammatic block diagram of the fuel supply for the prime mover;

FIGURE 3 is a schematic circuit diagram of the control system; and

FIGURE 4 is a diagrammatic section through the fuel control valve.

With reference to FIGURE 1 of the drawings, a prime mover or engine 10 drives an alternator 11, the output of which supplies electrical energy to a load 12. The operation of the alternator, i.e., the output frequency and the reaction of the alternator to load conditions, is governed through an engine controller 13 which operates with the prime mover 10. More specifically, in the system disclosed herein, the fuel supply to the engine is controlled.

Connected with the output of alternator 11 are load sensing and frequency sensing circuits 14 and 15, respectively, which develop electrical signals representative of a load condition on the alternator and the frequency of the alternator output. These signals are added in a suitable signal combining circuit, as transformer 16, the output of which is connected with a transistor amplifier 17 and coupled through a biased phase demodulator 18 to the engine controller.

A suitable indication is provided of the torque or energy delivered to the alternator mover, as the position of the engine controller or fuel valve, through the means of a differential transformer 19 which establishes an inverse feedback signal connected through the signal combining means 16 to transistor amplifier 17. This signal, which represents the rate of fuel flow to the engine, and thus the energy input to the alternator, is so connected in the signal combining circuit 16 that it tends to cancel the signal from the load sensing means 14. Thus, when the feedback signal from the differential transformer counteracts the control signal from the sensing means, the output of the frequency sensing circuits is zero, the output of the bias, phase sensitive demodulator 18 will be zero and the system is in a stable operating condition.

In a system where multiple power units are operated in parallel serving a common load, an interconnection between them is necessary to provide proper sharing of the load between alternators. Load sharing is accomplished by making slight adjustments in the phase of the alternators, so that one does not load another. For this purpose an additional control signal may be supplied from the other power units to signal combining means 16, as indicated diagrammatically.

The fuel supply for the prime mover 10 is shown in FIGURE 2 and comprises a fuel supply 20, as a tank of diesel fuel, from which a pump 21 supplies the fuel under pressure. A regulator 22 limits the fuel pressure to engine controller 13. The output pressure of pump 21 is greater than the regulator pressure setting so that the input fuel pressure to the engine controller is relatively constant.

FIGURE 4 illustrates the construction of a suitable engine controller or controlled fuel valve 13. A housing 25 has fuel inlet 26 connected with the regulated pressurized fuel source, regulator 22. Carried within housing 25 is a cylinder 27 having slidable therein a piston 28 which meters the flow of fuel between a port 29 connected with fuel inlet 26 and port 30 connected with a fuel outlet 31. The piston assembly 28 has opposed faces 32 and 33 which are exposed to isolated areas 34 and 35, both of which are filled with fuel under pressure from inlet 26. Areas 34 and 35 are each provided with metered or valved outlet openings 37 and 38, controlled by a rocker plate valve 39 mounted on a support 40 which is torsionally stressed on actuation of the valve and provides a mechanical restoring force on the plate. The valve is electrically actuated through a pair of coils 41 and 42 arranged to cause movement of rocker plate 39 about its pivot when one coil is energized with a higher amplitude current than the other. This movement causes the plate to open one of the two orifices 37 and 38 and to close the other, causing a change in the relative pressures in areas 34 and 35 and a movement of valve piston 28. More specifically, if coil 41 is energized with a higher amplitude current than coil 42, the rocker plate 39 is moved in a clockwise direction opening orifice 37 and closing orifice 38. This reduces the pressure of the fuel in area 34 and increases the pressure in area 35, causing the valve piston to move to the left, reducing the flow of fuel to outlet 31. When coil 42 is energized by higher amplitude current than coil 41, the reverse action occurs, moving valve piston 28 to the right, opening the valve orifices and increasing the fuel flow to the prime mover.

A non-magnetic extension 45 of valve piston 28 carries an end portion 46 of magnetic material which forms a part of a differential transformer 47. The differential transformer output is a signal having a phase and amplitude which indicates the relative position of valve piston 28.

FIGURE 3 is a schematic circuit diagram of a control system embodying the invention. The three phase alternator 11 has three phase leads or busses 51, 52 and 53 with corresponding neutral leads 54. The control system includes a frequency sensing means 55, a load sensing circuit 56 and a load sharing control circuit 57. Differential transformer 47 provides an inverse feedback signal representative of the position of the fuel control valve.

Alternating control signals from the frequency and load control circuits and from differential transformer 47 are coupled to the input transformer 60 of an A.C. transistor amplifier 61. The output of the transistor amplifier is coupled to a phase sensitive demodulator 62 which controls the application of power to the windings 41 and 42 of the fuel control valve.

In operation, assuming that there is no load on the alternator 11, there will be no control signal from the load sensing circuits. The fuel valve will be opened to the proper position to allow sufficient fuel flow to run the engine at a speed which will provide the correct frequency of operation of the alternator. Under these conditions, the differential transformer 47 is adjusted, as by varying potentiometer 63, for zero output. As a load is applied to the alternator, a load signal is developed in the load sening circuit 56 and a load control signal is applied to the transistor amplifier. This control signal results in an output from the phase sensitive demodulator 62, and in the establishment of an increased signal level in winding 42 of the fuel control valve. This is turn opens the fuel valve increasing the rate of fuel flow to the engine, to compensate for the increased load on the system. If the frequency of the alternator deviates from that which is desired, an output from the frequency sensing circuit 55 is coupled to the amplifier and further acts to control the valve position. When the alternator is operated in parallel with other alternators, a comparison signal applied to load sharing circuit 57 provides a further control signal which effects a correction of the load division if necessary.

The control circuit and its operation will now be described in more detail. Voltage transformers 65, 66 and 67 are connected respectively with the three phase lines 51, 52 and 53 of the alternator output. Secondary windings on phase transformers 65 and 66 are connected in series and with the primary winding 68a of transformer 68 in the frequency discriminator circuit. Transformer 68 has a first secondary winding 68b to which is connected a series resonant circuit including capacitor 69 and inductor 70, with the juncture between these two elements connected to a common reference point or ground 71. Secondary winding 68c is center tapped and has connected therewith a resistance-capacitance network including resistors 73, 74 and 75 between one end terminal and the center tap connection, which includes resistors 76, 77 and 78, while capacitor 79 is connected between the other end terminal and resistor 75. The circuit formed by capacitor 69 and inductor 70 resonates at a frequency of the order of 35 percent above the frequency of operation of the alternator, for example at 82 cycles per second for 60 cycle operation. The output of the phase shifting circuitry connected with secondary windings 68c is combined with the output of the resonant circuit providing a null or absence of output signal at lead 81 when the alternator is at the correct frequency. When the frequency of the alternator varies from resonance, a signal is developed between lead 81 and reference lead 71 having a phase and amplitude representative of the frequency deviation in direction and amplitude. This frequency deviation or frequency correction signal is applied through potentiometer 82 to primary winding 83 of amplifier input transformer 60.

A double-pole, double-throw switch 84 provides for varying the inductance 70 and the resistance in the phase shifting circuit to vary the frequency of operation, as between 50 and 60 c.p.s. For operation at a much different frequency, as 400 cycles, an entirely different frequency discriminator circuit may be substituted.

Each of the phase voltage transformers 65, 66 and 67 has secondary windings connected with wattmetric sensing circuits 86, 87 and 88, for each of the three phases, respectively. The wattmetric circuits include balanced phase detectors with voltage and current representing signals connected thereto. Across the load resistances of each of the wattmetric circuits, direct current signals are developed representative of the power supplied by each phase of the alternator. The load resistance circuits are connected in series and a signal representative of the total load on the alternator appears between terminal 89 and reference point 71. The series combination of a smoothing inductance 90 and a potentiometer 91 are connected in parallel with the load sensing circuit, and a resistive network including resistor 92 and potentiometer 93 shunts potentiometer 91 forming a bridge network.

The direct current load representing signal cannot be used directly in the alternating current amplifier, but must be converted to an alternating signal of proper phase and amplitude. A further secondary winding 94 on phase three voltage transformer 67 has a center tap returned to the movable tap of potentiometer 91, the load control signal adjustment. Secondary winding 94 energizes a ring modulator circuit 95 which converts the direct load control signal appearing across the bridge circuit to an alternating signal. The use of the bridge coupling circuit permits reversal of the polarity of the wattmetric signal broadening the range in which frequency drops with increased load may be controlled. The output of ring modulator 94 is connected with primary winding 97 of the amplifier input transformer 60, and the center tap of winding 97 is returned to the juncture point between resistors 92 and 93. Thus, an alternating current is developed in the input winding 97 corresponding in phase and amplitude with the polarity and amplitude of the load signal at the output of load sensing circuit 56.

Terminals 102 and 103 are connected through resistor 101 across a portion of potentiometer 104, which shunts the load detecting circuit. The signal at these terminals is utilized in the load balancing circuit which interconnects paralleled alternators, the terminals 102 and 103 being connected with corresponding terminals of the control systems for other alternators in the system. In the event an unbalance occurs between the alternators, a current will flow through the interconnected circuits applying a direct control signal to bring modulator 99, which is powered from winding 100 on transformer 67. The alternating output signal of modulator 99, which has a phase and amplitude respresentative of the polarity and amplitude of the D.C. load unbalance signal, is applied to primary winding 105 of transformer 60. Adjustment of potentiometer 104 may be made to set the load ratio between alternators.

The output of differential transformer 47 is connected through potentiometer 106 with transformer primary winding 107, providing the inverse or counterbalancing signal for the null operatong or null seeking alternator control system. Potentiometers 82, 91, 104 and 106 control the relative effect of the various control potentials and provide a means for attaining a proper balance in the operation of the system.

Transistor amplifier 61 includes three amplifier stages 109, 110 and 111. Suitable bias potentials for the transistors are derived from a full wave rectifier circuit 112 connected with secondary winding of transformer 113, which is energized from phase three of the alternator output. A filter circuit 113 smooths the rectified signal.

Amplifier stages 109, 110 and 111 are connected in grounded emitter cascade configuration and the bias network therefor includes a temperature compensation resistor 114 which provides temperature stability for the amplifier. Secondary winding 115 of amplifier input transformer 60 is connected through resistor 116 with the base of transistor 109. The output of transistor 109 is connected through resistor 117 with the base of transistor 110, the output or collector element of which is connected directly with the base of transistor 111. The output of power amplifier 111 is connected with the primary winding 102a of input transformer 120 for phase sensitive demodulator 62. The amplifier includes a feedback resistor 121 connected between the collector of transistor 111 and the base of the first amplifier stage 109 providing inverse feedback and stabilizing the operation of the amplifier. The direct coupled alternating current transistor amplifier has no capacitor but incorporates only resistive interstage coupling and bias networks. This eliminates many objectionable transient effects which tend to reduce the rapidity of response of the system.

Phase sensitive demodulator 62 is powered by a pair of full wave rectifier circuits 124 and 125 energized by phase three of the alternator. The secondary winding 120b of transformer 120 is connected with the base elements of demodulator transistors 126 and 127, the outputs of which are connected with the primary winding 128a of transformer 128. The center tap of demodulator input winding 120b is returned to the reference potential while the center tap of output winding 128a is connected with the transistor power supply. The secondary winding of transformer 128 has terminals connected with the power rectifier circuits 124 and 125, and a center tap connected with the juncture between the windings 41 and 42 of the fuel control valve. The other terminal of coil 41 is returned to the reference potential while winding 42 is connected with the power rectifier windings and the transistor power supply.

During stable operating conditions in the system, i.e., with the feedback potential from differential transformer 47 balancing the control signals from the load control circuits, the output of the biased demodulator 62 is balanced with equal currents flowing in coils 41 and 42. The position of the control valve 28 does not change. However, should conditions alter and an unbalance in the input signals to transformer 60 occur, the output of the phase sensitive demodulator is varied and the current through coils 41 and 42 is unbalanced. This results in an alteration in the position of the rocker plate 39 and the piston 28 of the fuel control valve. This changes the fuel supply to the engine to compensate for the altered conditions, and a different feedback voltage is derived from differential transformer 47 which tends to cancel the unbalance of signals to the transistor amplifier.

Connected between the output of the phase sensitive demodulator and the input of the amplifier (the center tap of input winding 105) is a differentiator circuit including capacitor 130 and resistor 131. This differentiator circuit serves to couple an anticipatory inverse feedback signal to the amplifier input, reducing the tendency of the null seeking system to shunt.

It is important that the proper phase relations be maintained throughout the control signal developing and phase detector system, in order to effect changes of the alternator operation of the proper nature. For this reason, the differential transformer, and the ring modulators 95 and 99 are powered from phase three of the alternator, as are the power rectifiers of the phase sensitive demodulator 62. The frequency control voltage is derived from phases one and two of the alternator and suitable phase correction made to provide the proper control signal phase at terminal 81.

While we have shown certain embodiments of our invention, it is to be understood that it is capable of many modifications. Changes, therefore, in the construction and arrangement may be made without departing from the spirit and scope of the invention as disclosed in the appended claims.

We claim:

1. In an electrical generating apparatus including a prime mover, a fuel supply for the prime mover, an alternator driven by the prime mover and a fuel control valve for the prime mover, a null seeking alternator control system of the character described, comprising: means for sensing the frequency of said alternator and for developing an alternating signal corresponding with the deviation of said frequency from a desired frequency; means responsive to a condition of the load current from said alternator for developing an alternating load control signal; means responsive to the position of said fuel control valve for developing an alternating signal in accordance with said position; a transistor amplifier having an input connected with said signal developing means combining said feedback signal in inverse relation with said frequency and load control signals; and a phase sensitive demodulator connected with said amplifier and having a controlled power output connected with said fuel valve, causing movement of said valve until said load control and feedback signals cancel.

2. In an electrical generating apparatus including a prime mover, a fuel supply for the prime mover, an alternator driven by the prime mover and a fuel control valve for the prime mover, a null seeking alternator control system of the character described, comprising: means for sensing the frequency of said alternator and for developing an alternating signal coresponding with the deviation of said frequency from a desired frequency; means responsive to a condition of the load current from said alternator for developing an alternating load control signal; means responsive to the relative share of a load carried by said alternator with other alternators, for developing an alternating load sharing control signal; means responsive to the position of said fuel control valve for developing an alternating feedback signal in accordance with said position; a transistor amplifier having an input transformer with multiple primary windings each connected with one of said signal developing means, combining said feedback signal in inverse relation with said load control signal; and a phase sensitive demodulator connected with said amplifier and having a controlled power output connected with said fuel valve, causing movement of said valve until said load control and feedback signals cancel.

3. In an electrical generating apparatus including a prime mover, a fuel supply for the prime mover, an alternator driven by the prime mover and a fuel control valve for the prime mover, an alternator control system of the character described, comprising: means for sensing a condition of the output of said alternator and for developing an alternating signal having a phase and amplitude as a function thereof; a transistor amplifier having an input connected with said signal developing means and having an output; and a phase sensitive demodulator connected with the output of said amplifier and having a controlled power output connected with said fuel control valve, to control the supply of fuel to said prime mover.

4. The control system of claim 3 wherein a direct current signal is developed, responsive to the output condition of said alternator, and including a modulator with an alternating output, the phase and amplitude of which are functions of the polarity and amplitude of said direct current signal.

5. In an electrical generating apparatus including a prime mover, a fuel supply for the prime mover, a three phase alternator driven by the prime mover and a fuel control valve for the prime mover, an alternator control system of the character described, comprising: a reactive frequency discriminating network connected with at least two phases of the output of said alternator for developing an alternating signal as a function of the deviation of the alternator frequency from a predetermined frequency; means connected with the other one of the phases of said alternator for developing a direct current signal representative of the alternator load; a modulator connected with said load sensing means and with other phase of said alternator and having an alternating output signal representative of said load condition; an alternating current transistor amplifier having an input to which said alternating control signals are connected and having an output; and a phase sensitive demodulator, synchronized with said other phase of the alternator, and having a controlled power output connected with said fuel control valve to control the supply of fuel to said prime mover.

6. In an electrical generating apparatus including a prime mover, a fuel supply for the prime mover, a three phase alternator driven by the prime mover and a fuel control valve for the prime mover, an alternator control system of the character described, comprising: a reactive frequency discriminating network connected with at least two phases of the output of said alternator for developing an alternating signal as a function of the deviation of the alternator frequency from a predetermined frequency; means connected with the other one of the phases of said alternator for developing a direct current signal representative of the alternator load; a modulator connected with said load sensing means and with said other phase of said alternator and having an alternating output signal representative of said load condition; means responsive to the position of said fuel control valve for developing an alternating inverse feedback control signal from said one phase, in accordance with said valve position; an alternating current transistor amplifier having an input to which said alternating control signals are connected and having an output; and a phase sensitive demodulator, synchronized with said other phase of the alternator, and having a controlled power output connected with said fuel control valve to control the supply of fuel to said prime mover.

7. The control system of claim 5 in which said frequency discriminating network includes a circuit resonant at the desired frequency and a resistance-capacitance phase shifting circuit, the output of said circuits being combined to provide the frequency deviation control signal.

8. In an electrical generating apparatus including a prime mover, a fuel supply for the prime mover, an alternator driven by the prime mover and a fuel control valve for the prime mover, an alternator control system of the character described, comprising: a reactive frequency discriminating network connected with the output of said alternator for developing an alternating signal as a function of the deviation of the alternator frequency from a predetermined frequency; means connected with said alternator for developing a direct current signal representative of the alternator load; a modulator connected with said load sensing means and with said alternator and having an alternating output signal representative of said load condition; an alternating current transistor amplifier having an input to which said alternating control signals are connected and having an output; and a phase sensitive demodulator, synchronized with said one phase of the alternator, and having a controlled power output connected with said fuel control valve to control the supply of fuel to said prime mover.

9. In an electrical generating apparatus including a prime mover, a fuel supply for the prime mover, an alternator driven by the prime mover and a fuel control valve for the prime mover, an alternator control system of the character described, comprising: a reactive frequency discriminating network connected with the output of said alternator for developing an alternating signal as a function of the deviation of the alternator frequency from a predetermined frequency; means connected with said alternator for developing a direct current signal representative of the alternator load; a modulator connected with said load sensing means and with said alternator and having an alternating output signal representative of said load condition; means providing a direct current load balance signal; a modulator connected with said signal providing means and with said alternator and having an alternating output signal representative of said load balance signal; an alternating current transistor amplifier having an input to which said alternating control signals are connected and having an output; and a phase sensitive demodulator, synchronized with said one phase of the alternator, and having a controlled power output connected with said fuel control valve to control the supply of fuel to said prime mover.

10. An alternator control system of the character described in claim 3 wherein said fuel control valve includes a direct current actuator connected with the output of said demodulator.

11. The control system of claim 3 wherein said condition sensing means includes a reactive frequency sensing circuit, means for energizing said reactive circuit with a signal out of phase with the output of said alternator and means for deriving from said reactive circuit a control signal in phase with the generator output.

References Cited by the Examiner

UNITED STATES PATENTS

| | | | |
|---|---|---|---|
| 2,780,733 | 2/57 | Chyba | 290—40 X |
| 2,790,092 | 4/57 | Guth | 290—40 |
| 2,809,339 | 10/57 | Guggi | 322—73 |
| 2,838,684 | 6/58 | Martine | 290—40 |
| 2,839,694 | 6/58 | Fairweather et al. | 322—20 X |
| 2,854,617 | 9/58 | Johnson | 322—20 X |
| 2,909,671 | 10/59 | Frederick | 290—40 |
| 2,909,672 | 10/59 | Emery | 290—40 |
| 2,909,779 | 10/59 | Emery | 290—40 X |
| 3,110,817 | 11/63 | Frederick | 290—40 |
| 3,122,696 | 2/64 | Graybeal et al. | 322—20 |

ORIS L. RADER, *Primary Examiner.*

MILTON O. HIRSHFIELD, *Examiner.*